(12) United States Patent
Hill et al.

(10) Patent No.: US 6,385,369 B1
(45) Date of Patent: May 7, 2002

(54) METHOD AND DEVICE FOR REDUCING POLARIZATION DEPENDENCE IN AN OPTICAL COMPONENT OR OPTICAL SYSTEM

(75) Inventors: Kenneth O. Hill, Kanata; Derwyn C. Johnson, Nepean, both of (CA); Gerald Meltz, Avon, CT (US)

(73) Assignee: Her Majesty the Queen in right of Canada as represented by the Minister of Industry, Ottawa (CA)

( * ) Notice: Subject to any disclaimer, the term of this patent is extended or adjusted under 35 U.S.C. 154(b) by 0 days.

(21) Appl. No.: 09/450,001

(22) Filed: Nov. 29, 1999

(51) Int. Cl.[7] ................................................. G02B 6/34
(52) U.S. Cl. .......................... 385/37; 385/31; 385/15; 359/483; 359/494; 359/499
(58) Field of Search ................................. 385/37, 31, 11, 385/15, 48, 27, 140; 359/483, 494, 497, 499

(56) References Cited

U.S. PATENT DOCUMENTS

| | | | |
|---|---|---|---|
| 5,061,032 A | | 10/1991 | Meltz et al. .................. 385/37 |
| 5,440,117 A | * | 8/1995 | Garrett et al. ............... 250/225 |
| 5,546,481 A | * | 8/1996 | Meltz et al. .................. 385/11 |
| 5,559,907 A | * | 9/1996 | Inniss et al. .................. 385/11 |
| 5,937,113 A | | 8/1999 | He et al. ....................... 385/11 |
| 6,050,109 A | * | 4/2000 | Kosinski et al. ............... 65/385 |

* cited by examiner

Primary Examiner—Rodney Bovernick
Assistant Examiner—Sung Pak
(74) Attorney, Agent, or Firm—Lacasse & Associates

(57) ABSTRACT

An polarization compensator is disclosed for passing light in a predetermined wavelength range. The compensator has unequal output orthogonal polarizations for light launched into the device within a specific wavelength range. A waveguide having a blazed grating having a blaze angle $\theta_{bl}$ of between 20° and 45° with respect to the optical axis of the waveguide exhibits a tap efficiency difference for orthogonal polarizations for offsetting and lessening a polarization dependence of the device. This waveguide is optically coupled with the optical device requiring polarization compensation. The grating is oriented about its optical axis to lessen the inequality in output orthogonal polarizations for light launched into the optical device.

18 Claims, 6 Drawing Sheets

METHOD AND DEVICE FOR REDUCING POLARIZATION DEPENDENCE IN AN OPTICAL COMPONENT OR OPTICAL SYSTEM

FIELD OF THE INVENTION

This invention relates to a method and device for providing polarization compensation for a polarization sensitive device. This invention further provides a means of compensating for birefringence in a device or waveguide.

BACKGROUND OF THE INVENTION

Since most optical signals propagating through optical fiber have an arbitrary polarization state, it is preferred that the switching/routing devices or other devices through which these signals propagate, be substantially polarization insensitive. Notwithstanding, although measures are taken in the design of switches, routers, multiplexers and other components to lessen their polarization sensitivity, tests often indicate that required levels of polarization sensitivity are not met. Planar waveguides usually have different propagation constants for TE (transverse electric) and TM (transverse magnetic) waveguide modes and are known to be polarization sensitive. Stated more simply, the response of these waveguides differs for orthogonally polarized light beams. For wavelength multi/demultiplexers, this difference in propagation constants results in a wavelength shift in the spectral response peak or the passband of each wavelength channel. This wavelength shift is sensitive to the design of the planar waveguide, and can be as large as 3 nm. As WDM systems are being designed towards smaller and smaller channel spacing (from 1.6 nm to 0.8 nm or even less in the future), even a small polarization dependent wavelength shift (e.g. 0.3–0.4 nm) is of concern.

Two types of integrated wavelength multi/demultiplexers that have been widely investigated are phased waveguide arrays and grating-on-a-chip spectrometers.

Grating based devices require high quality, deeply etched grating facets. The optical loss of the device depends critically on the verticality and smoothness of the grating facets.

However, the size of the grating device is usually much smaller than the phased array and the spectral finesse is much higher due to the fact that the number of grooves in the grating is much larger than the number of waveguides in the phased array. This allows the grating based device to have a larger number of channels available over its free spectral range (FSR) and consequently can be scaled-up easily to high density operation.

In waveguide array based devices, several approaches have been used to reduce the device polarization sensitivity; for example the insertion of a half wave plate in the middle of the waveguides array is described by H. Takahashi, Y. Hibino, and I. Nishi, in a paper entitled "Polarization-insensitive arrayed waveguide grating wavelength multiplexer on silicon", Opt. Lett., vol. 17, no. 7, pp. 499–501, 1992.

One patent which provides a useful solution for polarization compensation in a slab waveguide device, is U.S. Pat. No. 5,937,113 issued Aug. 10, 1999 to He et al., entitled "Optical grating-based device having a slab waveguide polarization compensating region".

Notwithstanding, the instant invention is believed to provide a more general solution to this problem of compensating for polarization sensitive optical devices, making them less sensitive to the polarization state of light passing therethrough.

The instant invention relies on the use of an in-line fiber grating to equalize the polarization dependence of an optical device. A similar type of blazed grating has been disclosed at OFC 1992, Feb. 4–7, 1992, San Jose Convention Center, San Jose, Calif., in a Tutorial Session (Tutorial TuK, page 132 of the Tutorial Digest) entitled "Fiber-Based Passive Components" presented by Kenneth O. Hill, the applicant on Feb. $4^{th}$, 1992.

Another later disclosure of a blazed grating used as a tap is found in U.S. Pat. No. 5,061,032 to G. Meltz et al. which discloses an optical fiber tap that comprises a blazed, chirped refractive index grating selected to redirect light guided in the fiber such that it comes to a focus at a point outside of the fiber. It is an object of Meltz et al. to provide a tap for extracting light from the grating section through the side of an optical fiber.

U.S. Pat. Nos. 5,850,302 and 5,832,156 in the name of Strasser et al. disclose improvements on the invention of Meltz et al. Strasser et al., further elucidate problems with the device of Meltz et al. by stating that "the tap of the '032 patent has some shortcomings. For instance, due to the relatively large (exemplary 22°) blaze angle that is required to achieve the desired redirection of the light guided in the fiber core to light in space outside of the fiber, the arrangement is subject to undesirable polarization effects, i.e., the fraction of light that is redirected by the grating depends on the polarization of the incident guided light. Whereas for low blaze angles (<10°) the polarization dependent difference in the amount of redirected light is at most about 0.54 dB, this difference increases rapidly with increasing blaze angle, being about 2.86 dB and about 6.02 dB for blaze angles of 22° and 30°, respectively. Furthermore, as those skilled in the art will appreciate, the fraction of redirected light decreases with increasing blaze angle, for a given index change. See, for instance, T. Erdogan et al., J. of the Optical Society of America-A, Vol. 13(2), p. 296 (1996)."

Strasser et al., further state that in view of the many important potential uses of an efficient, wavelength-selective fiber tap, it would be desirable to have available a fiber tap that is substantially free of the shortcomings such as the polarization dependence of the above discussed in the prior art tap. The Strasser specification illustrates the advantage of using blazed gratings having angles of about 15° or less.

It is clearly the goal of both Strasser et al., and Meltz et al., to provide a tap that is substantially polarization insensitive and which allows a suitable amount of light to be tapped. Both of these requirements rely on using blazed gratings having small angles, i.e., 15° or less.

In contrast, it is a object of the instant invention, to provide a blazed grating in combination with an optical element exhibiting polarization sensitivity, wherein the blazed grating taps a minimal quantity of light therefrom and is substantially of the opposite polarization sensitivity of the element and therefore is suitable for compensating for the polarization sensitivity of the optical element.

Along with the need to provide polarization compensation in an optical device, there is often the requirement to provide a particular birefringence in order to lessen unwanted polarization mode dispersion. In some instances it may be desired to induce a certain amount of birefringence into the optical circuit. Along with providing a novel solution for lessening polarization sensitivity by providing a blazed grating, this invention further provides a method of providing an induced birefringence thereby providing compensation for polarization mode dispersion (PMD) and well as polarization dependent loss (PDL).

SUMMARY OF THE INVENTION

In accordance with an aspect of the invention, there is provided, an optical system comprising:

an optical device for passing light in a predetermined wavelength range, having substantially unequal insertion losses for orthogonal polarizations of light launched into the device and thus has a polarization dependent loss within said wavelength range; a waveguide having a longitudinal optical axis that is connected to said optical device, the waveguide having a blazed grating therein having a blaze angle θ of between 20° and 60° with respect to the optical axis of the waveguide, the blazed grating exhibiting a polarization dependent loss that is of the same magnitude as the polarization dependent loss of the connected optical device, and the grating being oriented about its optical axis to lessen the total polarization dependent loss of the combination of said blazed grating and said optical device.

In accordance with another aspect of the invention, a method of lessening polarization dependence of an optical device to a band of wavelengths of light passing therethrough is provided, comprising the steps of providing in an optical waveguide, coupled with the optical device a blazed grating, having a blaze angle of between 15° and 85° and orienting the blazed grating such that a polarization dependence of the device at the band of wavelengths passing therethrough is lessened.

Advantageously, this invention provides a method of further controlling polarization aspects related to the waveguide by irradiating the waveguide in a prescribed manner to induce a birefringence.

BRIEF DESCRIPTION OF THE DRAWINGS

Exemplary embodiments of the invention will now be described in conjunction with the drawings in which.

DETAILED DESCRIPTION

Figure 1:
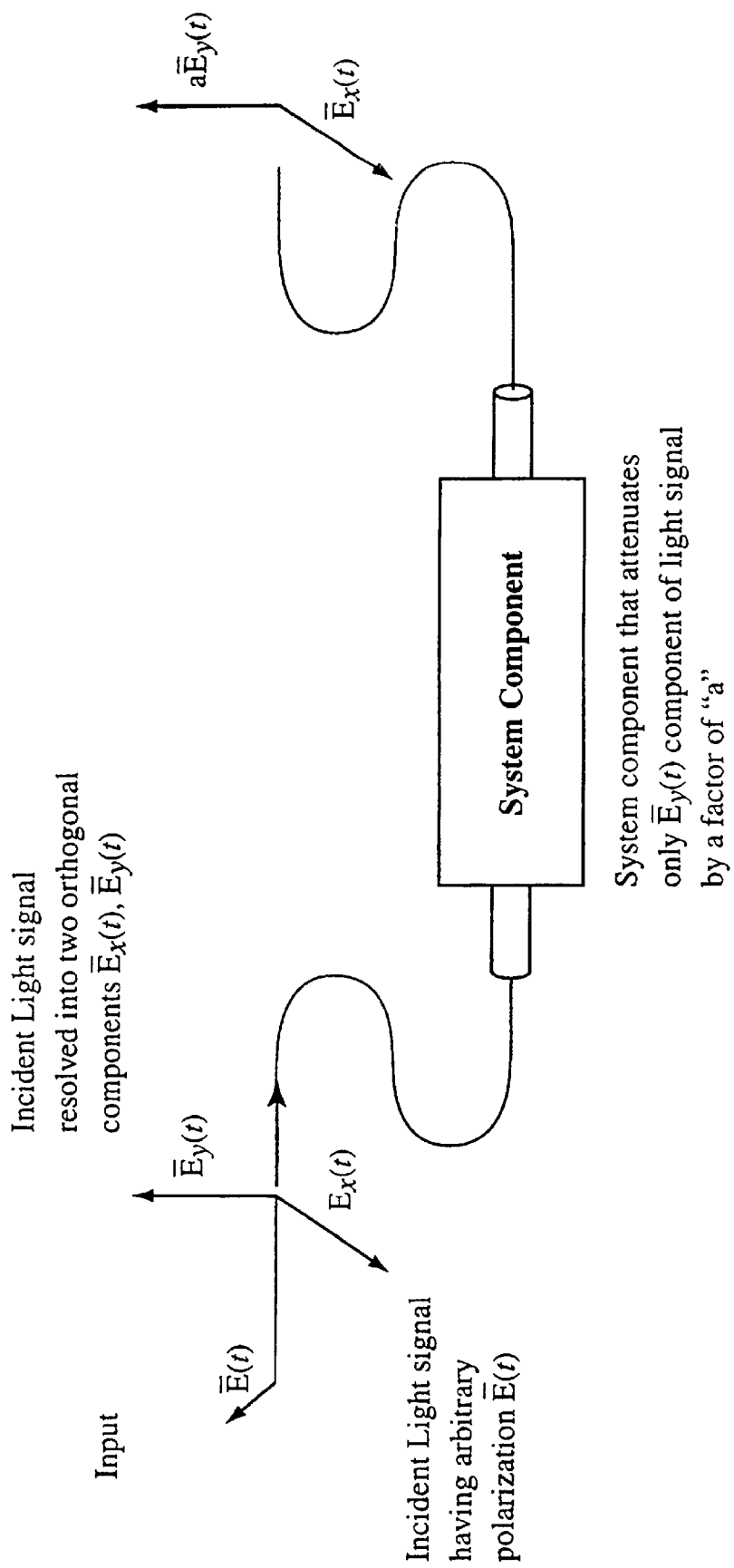
FIG. 1 is a schematic diagram showing an optical component of a system and the dependence of the insertion loss of the component on the polarization of the light signal.

Turning now to FIG. 1 an optical component of an optical system is shown. An input light beam with polarization $\overline{E}(t)$ is shown resolved into two orthogonal components $\overline{E}_x(t)$ and $\overline{E}_y(t)$ wherein the component in this instance attenuates $\overline{E}_y(t)$ by a factor of "a" yielding a $\overline{E}_y(t)$ at the output of the device. The polarization dependent loss (PDL) of a device is the maximum peak-to-peak insertion loss (or gain) variation caused by a component when stimulated by all possible polarization states. Within this specification and in the claims defined herein, reference is made to blaze angles of a blazed Bragg grating. In the context of the instant invention, it should be understood, that reference to angles of between, for example 20° and 45° include the range of angles between 45° and 70°. Hence what is meant by the range of angles between 20° and 45° is 45°±25°.

Figure 2:
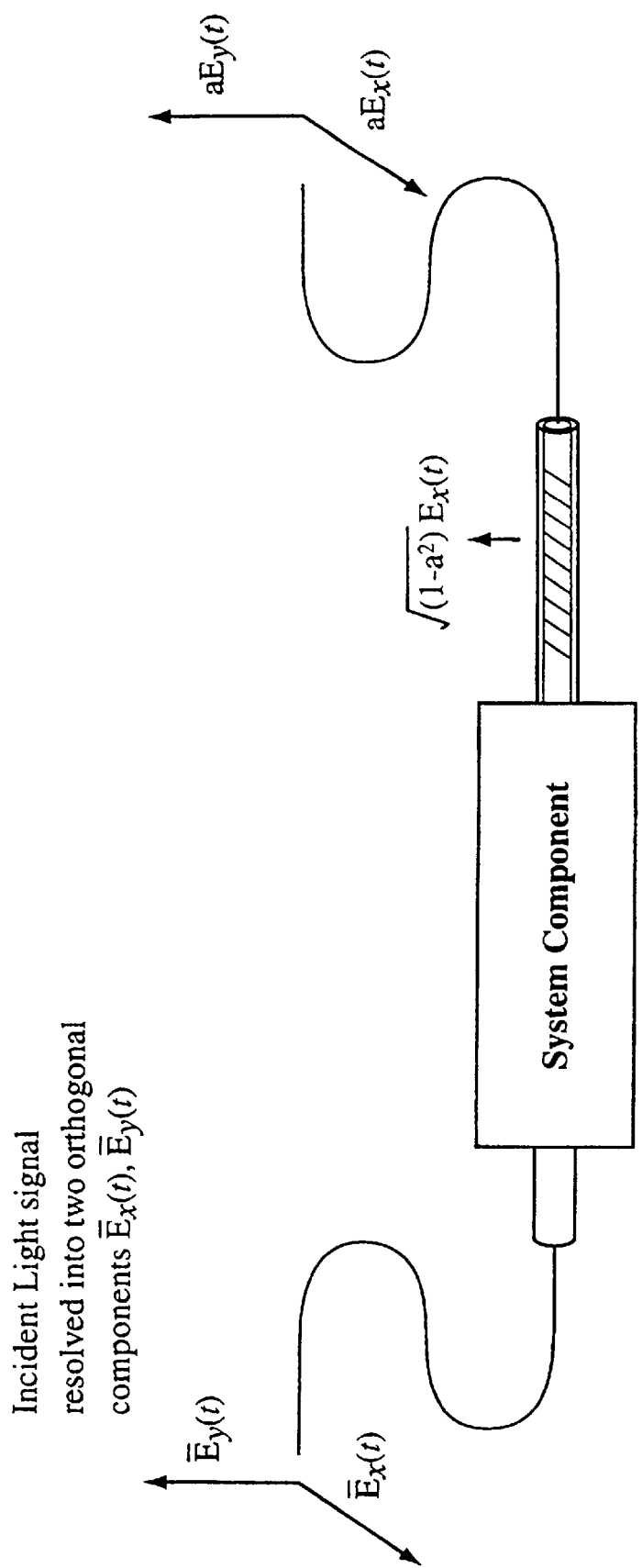
FIG. 2 is a schematic diagram showing how the polarization dependence of the insertion loss of the optical component illustrated in FIG. 1 can be reduced or minimized by inserting a grating trimming element in the transmission path of the optical component.

Referring now to FIG. 2 an optical component is shown that is substantially polarization insensitive. A system optical component having an unwanted attenuation "a" for $\overline{E}_y(t)$ polarized light launched into the device is shown coupled to an equalizing element in the form of a blazed Bragg grating. The grating is designed in such a manner as to have a suitable strength by way of having suitable refractive index variations and length, and has a required blaze angle to attenuate light essentially along only one of two orthogonal axes by a factor of "a". In order for the grating to function as an equalizer, its optical axis is oriented with respect to the optical component such that light passing therethrough having an $\overline{E}_x(t)$ component is attenuated by a factor of "a". Selecting a grating to achieve a required attenuation in one of two orthogonal axes can be done by an iterative process that will be described in detail hereafter. Briefly the process involves writing a grating in-situ, that is writing a grating in a fiber connected to the system optical component, while monitoring the total polarization dependent loss of the optical component plus grating. The polarization dependent loss of the grating is increased incrementally with additional irradiations of ultraviolet light such as to minimize by taking small iterative steps the total polarization dependent loss. Alternatively, a blazed grating having known characteristics can be utilized alone or in tandem with other gratings having known characteristics oriented in such a manner as to lessen unwanted polarization dependence of an optical component.

In the following, the grating element is modeled theoretically in order to calculate the amount of light coupled out for each polarization.

Phase-Matching

Figure 3:
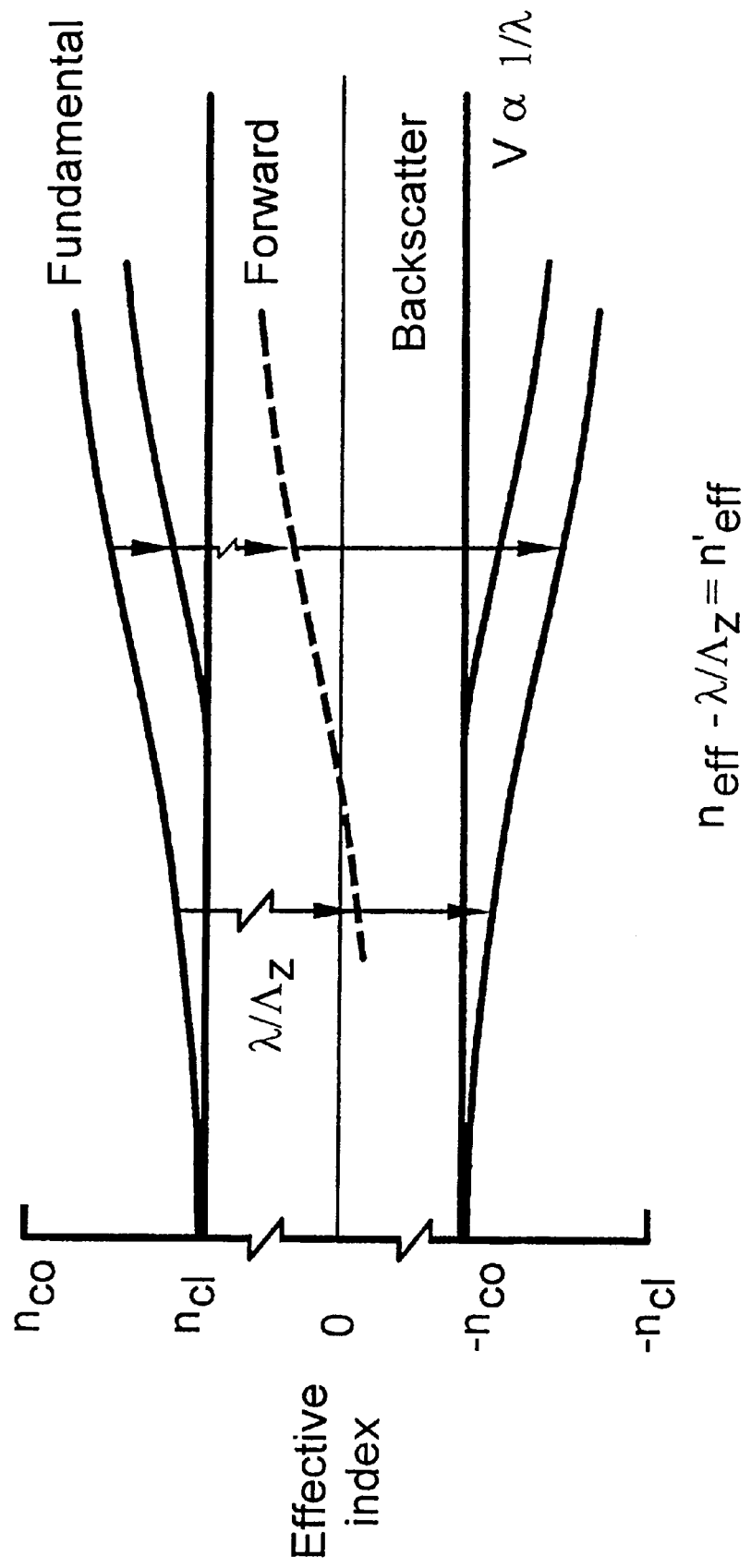
FIG. 3 illustrates phase-matching conditions to achieve synchronous mode coupling with a fiber Bragg grating.

A Bragg grating will couple dissimilar modes in reflection and transmission provided two conditions are satisfied: (1) phase synchronism and (2) sufficient mode overlap in the region of the fiber that contains the grating. The phase-matching condition, which ensures a coherent exchange of energy between the modes, is given by $$n_{eff} - \lambda/\Lambda_z = n'_{eff}, \qquad (1)$$

where $n_{eff}$ is the modal index of the incident wave and $n'_{eff}$ is the modal index of the reflected (a negative quantity) or transmitted wave. Allowance is made for a tilt or blaze in the grating by using the grating pitch along the fiber axis $\Lambda_z$ in this equation. To more readily understand this requirement the mode-coupling and phase-matching conditions are illustrated graphically in FIG. 3. The ratio of the wavelength $\lambda$ and the grating pitch $\Lambda_z$ along the fiber axis determines which type of mode (cladding or bound, backward or forward-propagating) is excited by the forward-propagating, incident $LP_{01}$ fundamental mode.

Five different types of interactions that can occur are shown; these depend upon on the ratio of the wavelength and pitch of the grating. Ordinary bound-mode propagation occurs when the effective index of the wave lies between the cladding and core values. A grating that reflects a like mode couples waves between the upper, forward-propagating branch of the dispersion relation, to its lower negative-going, mirror image. This occurs when the grating has a pitch sufficiently fine that the Bragg condition $\lambda_B=2n_{eff}\Lambda$ is obeyed. However, this same grating will also couple to other modes at shorter wavelengths; some will be reflected and or absorbed, and others will be radiated away from the fiber. The dotted line (not to scale) is a locus of wave-coupling between a forward-going fundamental mode and modes within the cladding. These interactions are seen as a series of many transmission dips in the spectrum at wavelengths that are less than the Bragg wavelength [1]. When index matching fluid is applied to the surface of the cladding then these modes radiate [2]; i.e., total reflection is frustrated by the index matching layer. No cladding modes are excited in a single mode-fiber unless the effective index of the excited mode is less than the cladding $n_{cl}$ (with a simple matched cladding profile).

If the grating period is much coarser, another useful situation arises. Now the fundamental mode exchanges energy in a resonant fashion with a forward-going cladding mode. The effect is similar to mode coupling in a two-core fiber, or between modes in a multi-mode waveguide. These gratings can be made easily with a simple transmission mask because the required pitch is a few hundred microns, as contrasted with the fine sub-micron pitch that is required to reflect a bound mode.

If the grating is tilted or radially non-uniform, interactions will take place between symmetric and asymmetric modes. For example, the grating can be used to couple the fundamental to the next lowest order mode as shown on the right side of FIG. 3.

Figure 4:
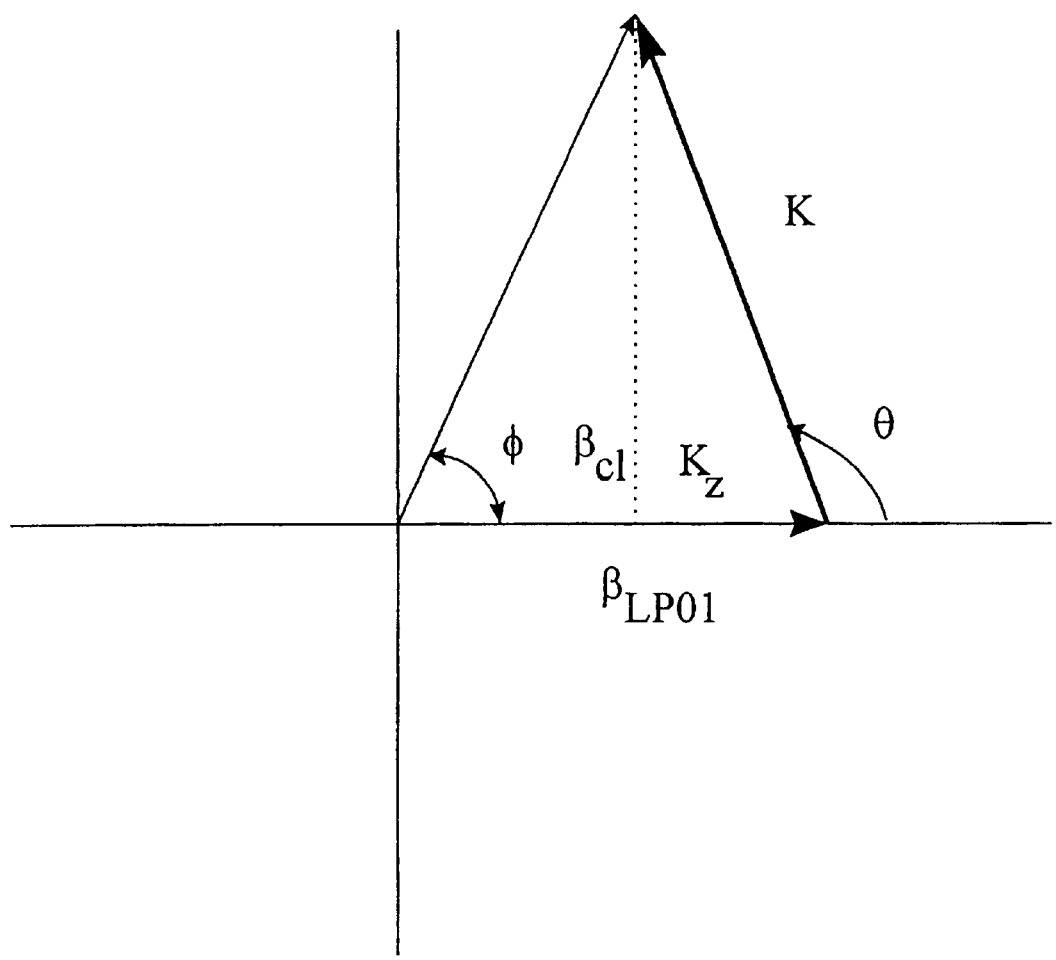
FIG. 4 depicts the phase matching condition to couple light from a bound mode via a blazed grating into a radiation mode.

A blaze or tilt in the grating is optimum for coupling into radiation modes that match a mirror-condition for the plane in which the index perturbation is constant. Consider the phase-matching requirement for a grating which is blazed at an angle $\theta_t=\theta-\pi/2$ measured from the fiber axis in the direction of forward propagation. The radiated wave will propagate with an effective index that is approximately equal to the cladding value. Phase-matching is achieved if the grating wavenumber along the fiber axis $K_z=(2\pi/\Lambda)\cos(\theta)$ equals the difference between the z-component of the propagation constant of the radiated wave $\beta_{cl}$ and the propagation constant $\beta_{LP01}$ of the incident bound mode. FIG. 4 depicts this condition graphically.

FIG. 4 shows that the blazed grating synchronous couples a bound mode into a radiation mode that propagates at an angle $\phi$ with respect to fiber axis. When the phase-matching condition is satisfied the scattered light from the grating adds coherently across the core of the fiber. Design conditions are simplified by approximating the effective modal indices of the bound and radiated fields by the cladding value $n_{cl}$. The required mask pitch $\Lambda_m$ which is twice the value of the grating pitch $\Lambda$ then becomes $$\Lambda_m=\lambda/[n_{cl}\sin(\phi/2)]$$

with $$\theta_t=\phi/2.$$

For example, for $\lambda=1.55\ \mu m$ and $\phi=90°$ the required pitch for the phase mask is about 1.5 $\mu m$. There is some latitude in the choice of blaze angle although 45° is the desired blaze angle for maximum efficiency as is shown in Table 1.

Complications arise in the actual tap fabrication process because of three factors: (1) Conical diffraction of a focused beam which distorts the fringe pattern; (2) Refraction at the curved surface of the fiber; and lastly, (3) Lack of spatial and temporal coherence in the UV writing beam. Computation of the fringe pattern is complex since it involves an analysis of the Talbot images using exact, Floquet, grating-diffraction theory and coherent ray tracing through the curved cladding-air interface. Many of these issues do not arise if the mask is not tilted or if the fiber has a rectangular cross-section. The distortions in the Talbot fringe pattern are less severe if the tilt or blaze is small. Of course, the light will be reflected at the cladding-air interface unless a prism or index-matching oil is used to frustrate the total internal reflection.

Out-Coupling

The brightness distribution and out-coupling efficiency of a weak tap can be estimated by using an approach based on antenna theory. In this formulation, which closely follows the work of Snyder and Love [3], wherein the tap is modeled as a volume distribution of microscopic current sources, which are excited by the incident, bound mode. The strength of the current density depends on the local amplitude and phase of the bound mode. If the tap is weak, i.e. the photoinduced index change is small and the tap is not too long, then the Born approximation is used to compute the radiation. A further simplification, which is appropriate for a weak tap and out-coupled radiation that exceeds the condition for critical reflection at the cladding, is to use a "free-space" Green's function and to evaluate the radiation from each elemental current source as if it was embedded in an infinite cladding. This approximation can be corrected for the presence of the core, but it still will not account for multiple reflections within the core or partial reflections from the cladding-air interface.

Figure 5:
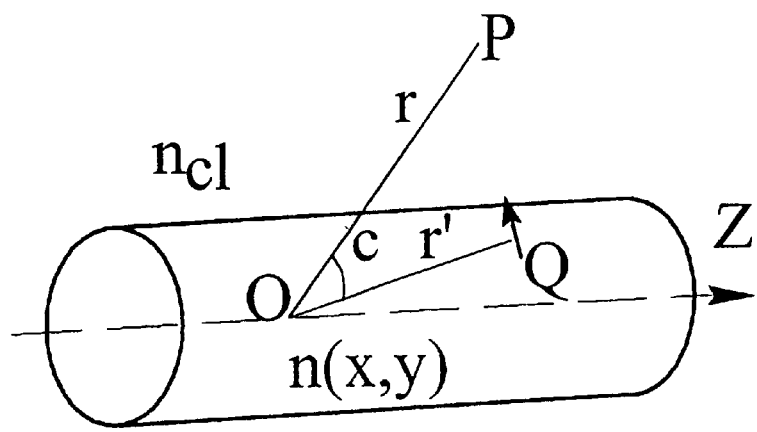
FIG. 5 shows the coordinate system used in the calculation of the current density J.

Consider an infinitesimal current density J located within the fiber at a point Q. The coordinate system is shown in FIG. 5.

An elemental current source J is at a position r' within fiber core is shown. P is a point outside the core at a distance r>>r'.

In the weak guidance limit the Cartesian components of A satisfies the Helmholtz equation $$\{\nabla^2+k^2n^2\}A=-\mu_0 J, \qquad (2)$$

where n=n(x,y) is the refractive index profile of the fiber and J=J(x,y,z) is the induced current distribution. In the far-field, that is at points sufficiently distant from the fiber core, the field is locally plane and it can be shown [3] that $$E=\frac{ik}{(\mu_0\varepsilon_0)^{1/2}}\hat{r}x(\hat{r}xA) \qquad (3)$$

and $$H=n_{cl}(\varepsilon_0/\mu_0)^{1/2}\hat{r}xE \qquad (4)$$

from which one can compute the power flux S and the total radiated power $P_{rad}$.

Figure 6:
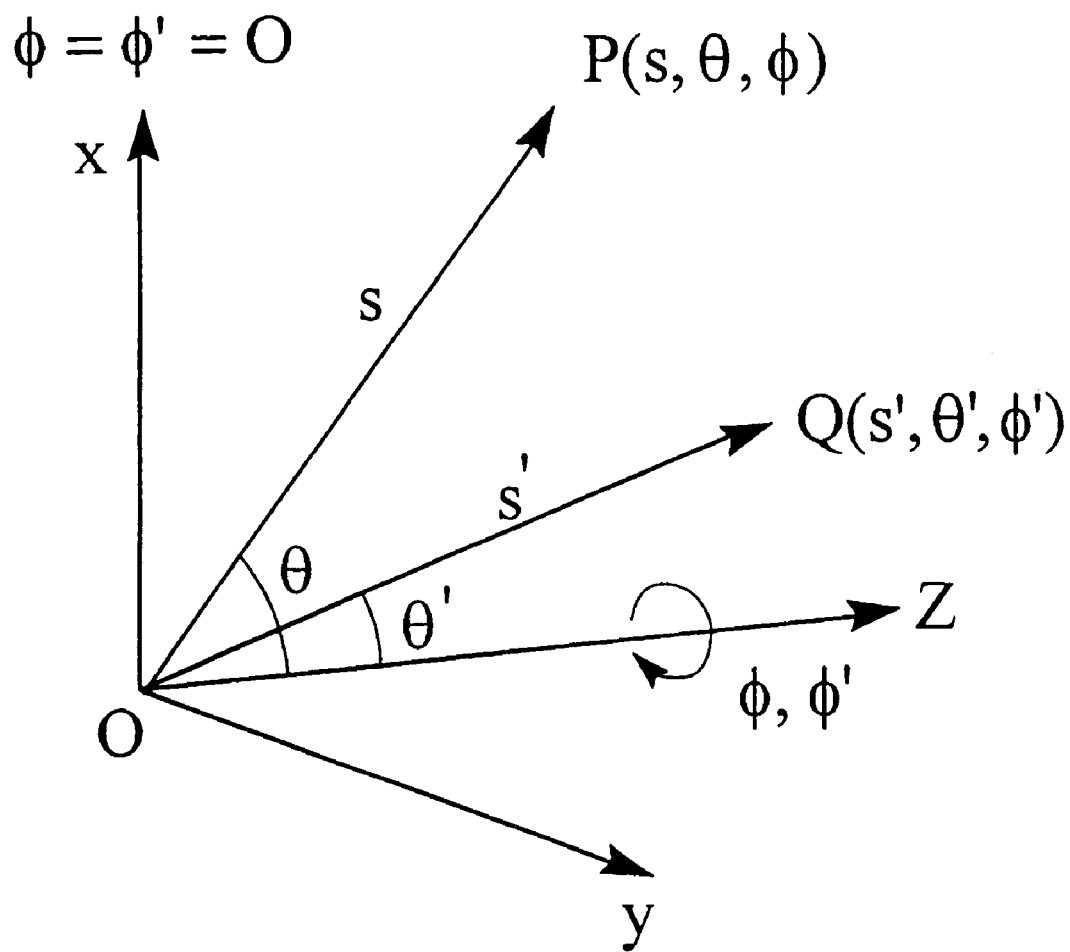
FIG. 6 shows the spherical coordinate system used to locate the observation point P and the current source Q.

Spherical coordinates are used to locate the observation point P and the position of the current source Q with respect to the center of the fiber grating, as shown in FIG. 6. Elevation angles $\theta$ and $\theta'$ are measured from the direction of forward propagation along the fiber axis z and the azimuthal coordinates $\phi$ and $\phi'$ are referenced to the vertical axis x.

Each Cartesian component of the vector potential is calculated from the Green's function solution of Eq. (2). For most cases of interest, it will suffice to use the "free space" approximation, i.e. to neglect the core and cladding-jacket interfaces, to obtain this solution. It has the form of an outgoing spherical wave for each component of A:

$$G(r,r')=\exp\{ikn_{cl}|r-r'|\}/(4\pi|r-r'|)$$

where k is the free space wavenumber and n has been set equal to the refractive index of the cladding $n_{cl}$. In the far-field of the tap, i.e. when $s=|r|>>|r'|=s'$, $$G(r,r')\approx\exp\{ikn_{cl}s\}/(4\pi s)\exp\{-ikn_{cl}s'\cos\chi\}$$

and thus $$A = \mu_0 \int_{v'} G(r,r')J(r')dv'$$

It is convenient to separate the spherical wave factor from the other terms in this expression by defining a vector M that only depends on the grating properties and the form of the incident guided mode:

$$M = \int_{v'} J(r')\exp(-iks'n_{cl}\cos\chi)dv' \quad (5)$$

Thus, $$A = \frac{\mu_0}{4\pi s} M\exp(iksn_{cl}) \quad (6)$$

From Eqs. (3)–(6) and the definition of the Poynting vector S, we obtain key expressions for the irradiance and the out-coupled, radiated power.

$$S = \frac{k^2 n_{cl}}{32\pi^2 s^2}(\mu_0/\varepsilon_0)^{1/2}\{|M_\theta|^2 + |M_\varphi|^2\}r \quad (7)$$

$$P_{rad} = \frac{k^2 n_{cl}}{32\pi^2}(\mu_0/\varepsilon_0)^{1/2}\int_0^{2\pi}\int_0^\pi \{|M_\theta|^2 + |M_\varphi|^2\}\sin\theta\,d\theta\,d\varphi \quad (8)$$

where $$M_\theta=\cos\theta\cos\phi M_x+\cos\theta\sin\phi M_y \quad (9)$$

$$M_\phi=-\sin\phi M_x+\cos\phi M_y \quad (10)$$

The induced current is related to the electric field of the incident mode and the index perturbation. Let $\bar{n}(x,y,z)$ be the unperturbed refractive index distribution in the fiber. Since $$\nabla\times H=i(\varepsilon_0/\mu_0)^{1/2}k(\bar{n}^2-n^2)E-i(\varepsilon_0/\mu_0)^{1/2}k\bar{n}^2 E$$

we can identify an induced polarization current density $J=i(\varepsilon_0/\mu_0)^{1/2}k(\bar{n}^2-n^2)E$ set up by the presence of the grating. The photoinduced index change $\delta n$ will always be much less than $\bar{n}$; thus $$J\approx -i(\varepsilon_0/\mu_0)^{1/2}k2\delta n\bar{n}E. \quad (11)$$

In general, the field within the grating is unknown; however, if the perturbation is small and the effect of multiple scattering within the grating is neglected, then a good approximation is to assume that the field is the same (apart from an amplitude factor) as the incident mode. Employing the usual weakly-guiding approximation, we use the linearly-polarized $LP_{01}$ field $E_t$ to approximate the hybrid $HE_{11}$ mode and then set it equal to E.

$$E \approx E_t = a_1(z)J_0(UR)/J_0(U)\exp(i\beta z)\begin{Bmatrix}\hat{x}\\\hat{y}\end{Bmatrix} \quad (12)$$

with $$U=a(k^2 n_{co}^2-\beta^2)^{1/2},$$

where $R=\rho/a$ is the normalized fiber radius and the polarization directions $\hat{x}$ or $\hat{y}$ are defined by the grating perturbation and the fiber axis. We choose $\hat{x}$ to lie in the plane that contains K, the grating wavenumber, and the fiber axis $\hat{z}$. The orthogonal direction $\hat{y}$ is normal to that plane and thus lies along a plane in which the grating perturbation is constant. With these conventions, $$K=(K_x\hat{x},K_z\hat{z}) \quad \delta n=\delta n_0\cos(K\cdot r')$$

$$r'=(x',y',z') \quad x'=\rho'\cos\phi' \quad y'=\rho'\sin\phi'$$

$$K_z=K\cos\theta_{tilt} \quad K_x=K\sin\theta_{tilt}$$

$$K\cdot r'=2\pi/\Lambda(\rho'\cos\phi'\sin\theta_{tilt}+z'\cos\theta_{tilt})$$

The blaze or slant angle $\theta_{bl}$, defined as the angle between a Bragg plane or surface of constant index change, is related to the tilt angle $\theta_{tilt}$ by $\theta_{bl}=\theta_{tilt}-\pi/2$. In the absence of refraction at the fiber-air interface $\theta_{bl}$ is the angle between the fiber axis and the phase mask ridges. If the grating is not slanted or blazed, $\theta_{tilt}=180°$.

Substituting Eqs. (11) and (12) into (5), and noting (from FIGS. 3 and 4) that $$s'\cos\chi=\rho'\sin\theta\cos(\phi-\phi')+z'\cos\theta$$

with $$\rho'=s'\sin\theta' \quad z'=s'\cos\theta',$$

leads to an expression for M in terms of the fiber and grating properties:

$$M = -i(\varepsilon_0/\mu_0)^{1/2}k2\delta n\bar{n}\int_0^a\int_{-L}^L\int_0^{2\pi} J_0(U\rho'/a)/J_0(U)\cdot \quad (13)$$

$$\exp(i\beta z')\begin{Bmatrix}\hat{x}\\\hat{y}\end{Bmatrix}1/2\{\exp[i2\pi/\Lambda(\rho'\cos\varphi'\sin\theta_{tilt}+z'\cos\theta_{tilt})]+$$

$$\exp[-i2\pi/\Lambda(\rho'\cos\varphi'\sin\theta_{tilt}+z'\cos\theta_{tilt})]\}\cdot$$

$$\exp[-ikn_{cl}(\rho'\sin\theta\cos(\phi-\phi')+z'\cos\theta)]d\varphi'dz'\rho'd\rho'$$

The integrals can all be done analytically to give a relatively simple expression for the scattered intensity distribution. We begin with the two azimuthal integrations:

$$\int_0^{2\pi} d\varphi'\exp\{\pm i[K_x\rho'\cos\varphi'-\rho'\sin\theta\cos(\phi-\phi')]\} = 2\pi J_0(C_{1,2}\rho'/a) \quad (14)$$

with $$C_{1,2}=[(K_x a)^2+(kan_{cl})^2\sin^2\theta\pm 2(K_x a)(kan_{cl})\sin\theta\cos\phi]^{1/2}, \text{ respectively.}$$

The two integrals along the length 2L of the grating yield the Bragg conditions for positive and negative-going modes and thus show that the tap is bi-directional.

$$\int_{-L}^{L} dz' \{\exp[i(\beta \pm K_z - kn_{cl}\cos\theta)z']\} = 2L[\sin(B_{1,2}L)/(B_{1,2}L)], \quad (15)$$

where $B_{1,2} \equiv \beta \pm K_z - kn_{cl}\cos\theta = 0$ determine the angles $\theta = \theta_{B1}$, $_{B2}$ at which the Bragg conditions are satisfied. The choice of sign corresponds to the direction of propagation of the fundamental mode. The two angles are related by $\theta_{B2} = \pi + \theta_{B1}$, i.e. they are in opposite directions. We direct attention to the first case $B_1 = 0$ and simplify the discussion by only considering propagation in the positive z direction, denoting $\theta_{B1}$ by $\theta_B$. The last integrals over $\rho'$ are of the form $$\int_0^a J_0(U\rho'/a)J_0(C_{1,2}\rho'/a)\rho' d\rho' = \frac{a^2}{C_{1,2}^2 - U^2}[C_{1,2}J_0(U)J_1(C_{1,2}) - UJ_0(C_{1,2})J_1(U)] \quad (16)$$

$$\equiv a^2 G(U, C_{1,2})$$

These results can be collected and substituted into Eq. (7) to yield explicit expressions for the radiated intensity $S(\theta,\phi)$ when the fundamental mode is linearly polarized along the y or x direction.

$$S = S_0 f_{1,2}(\theta, \varphi) \begin{cases} [\cos^2\theta\sin^2\varphi + \cos^2\varphi] & \text{for polarizational along } y \\ [\cos^2\theta\cos^2\varphi + \sin^2\varphi] & \text{for polarization along } x \end{cases} \quad (17)$$

where $$S_0 = \tfrac{1}{2}(ka)^2(kL)^2 n_{cl}(r/a)^{-2}(\epsilon_0/\mu_0)^{1/2} \overline{n}^2(\delta n_0)^2/J_0^2(U) \quad (18)$$

and the radiation pattern $f_{1,2}(\theta, \phi)$ factors into to the product of a function $G(U, C_{1,2})$ which can be thought of as "element" pattern, independent of the grating length, and a term that is identical to the sinc function that describes a linear array of dipole sources:

$$f_{1,2}(\theta,\phi) = G^2(U, C_{1,2})[\sin(B_{1,2}L)/(B_{1,2}L)]^2 \quad (19)$$

Several of the general properties of the radiated intensity distribution can be inferred from examination of these two functions. First, the beam will be in the form of a very narrow conical pattern in elevation, that is, along the $\theta$ spherical coordinate, with the peak centered along the Bragg angle determined by $B_{1,2} = 0$. The null-to-null width $\Delta_\theta$ is $\Delta_\theta = 2\lambda/[n_{cl} l_g \sin\theta_B]$, where $l_g = 2L$ is the grating length. For example, if $l_g = 5$ mm, $\theta_B = 90°$ and $\lambda = 1.55$ $\mu$m, then, $\Delta_\theta = 0.02°$. Second, when the blaze angle is set to match the transverse Bragg condition, namely, $K_x = K\cos\theta_{bl} = kn_{cl}\sin\theta_B$, $C_1 = 0$ and $G(C_1 = 0, U) = J_1(U)/U$ and the azimuthal pattern has a maximum value. This pattern is also symmetric about the meridian plane $\phi = 0$.

The polarization dependence comes from the dipole nature of the scattering. Consider the case of a grating designed to radiate a beam normal to the fiber axis when the fundamental mode is polarized along the y-axis. If the mode is polarized along the x-direction, then the maximum will be normal to x-z plane along $\phi = \pi/2$, for this azimuth $C_1 = \sqrt{2} kan_{cl} \gg 1$ and $G^2 \ll 1$.

The out-coupling efficiency $\eta$ defined as the ratio of the total radiated power to the power in the incident fundamental mode is computed from the expression for the intensity by integration over a of the grating. From Eqs. (17)–(19), $$\eta = (kL)(ka)^2 n_{co}(\delta n_0)^2 \left[\frac{UK_0(W)}{VJ_0(U)K_1(W)}\right]^2 H(\theta_{bl}, \theta_B) \quad (20)$$

where $$H(\theta_{bl}, \theta_B) = \int_0^{2\pi} d\varphi G^2(U, C_{1,2}) \begin{cases} [\cos^2\theta_B \sin^2\varphi + \cos^2\varphi] & \text{polarization along } y \\ [\cos^2\theta_B \cos^2\varphi + \sin^2\varphi] & \text{polarization along } x \end{cases}$$

with $W = (V^2 - U^2)^{1/2}$ and $V = 2\pi a/\lambda (n_{co}^2 - n_{cl}^2)^{1/2}$.

Three approximations have been used in deriving this expression. In $C_{1,2}$ and in the dipole factor {[ . . . ]}, we set $\theta = \theta_B$ because the beam is very narrow in elevation and is centered on the Bragg angle. We also make the following approximation in evaluating the integral over all elevations:

$$\int_0^\pi \text{sinc}^2(B_{1,2}L)\sin\theta d\theta \approx 1/(kn_{cl}L) \int_{-\infty}^\infty \text{sinc}^2 x\, dx = \pi/(kn_{cl}L)$$

This is valid provided $kn_{cl}L \gg 1$, which is generally true.

The tap is also assumed to be weak in the preceding analysis since we have approximated the exact expression for the attenuation of the fundamental mode power P(z) by $$[P(-L) - P(z)]/P(-L) = 1 - \exp[-\gamma(z+L)] \approx \gamma(z+L),$$

where $\gamma = \eta/(2L)$ is the attenuation coefficient for a short length of grating that at least contains many periods. The analysis can easily be extended to a longer grating by using the exact expression for the attenuation and modifying the equation for the intensity by including the exponential attenuation of the field in the expression for the induced polarization current density.

Equation (20) provides the tap efficiency for the two principal states of polarization. Using Equation. (20), a table such as exemplary Table 1 shown below can be computed (y-pol is in the plane of photoinduced index change; x-pol is orthogonal to y-pol; both are orthogonal to the fiber axis: z) for a typical step index telecommunications fiber (relative photoinduced index change amplitude = $5 \times 10^{-4}$, grating length 5 mm, operating wavelength 1.55 $\mu$m).

TABLE 1 of Tap Efficiency Dependence on Bragg Scattering Angle and Polarization relative to the Grating-Incidence Plane

| Grating Period ($\mu$m) | $\theta_{bl}$ Blaze Angle | $\theta_B$ Bragg Angle | Efficiency (%) y-pol | x-pol |
|---|---|---|---|---|
| 0.54 | 81.2 | 161 | 9.6 | 8.7 |
| 0.55 | 76 | 151 | 6.4 | 5 |
| 0.57 | 69.4 | 138 | 4.6 | 2.6 |
| 0.6 | 62.8 | 125 | 3.8 | 1.3 |
| 0.75 | 45.4 | 90 | 3.1 | 0.014 |
| 1.5 | 20.8 | 41 | 4.7 | 2.6 |
| 3 | 10.2 | 20 | 8.9 | 7.9 |
| 4 | 7.6 | 15 | 11.9 | 11.2 |

Step index fiber, $\lambda$ = 1.55 $\mu$m, $1_{gr}$ = 5 mm and $\delta n_0/n$ = 5 × 10$^{-4}$.

A large differential tap efficiency for a 45° blaze angle is shown. This grating has a 3% outcoupling efficiency or loss (0.13 dB) for y-polarized light and only 0.014% loss (−0.00061 dB) for x-polarized light.

It can be inferred from Eqn. (20) that a 10 mm long grating (2×5 mm) of the same type would have a y-pol loss of 0.26 dB and an x-pol loss of 0.00121 dB—essentially zero. Such a device compensates an optical fiber device with polarization-dependent loss of 0.26 dB and a base loss BL dB. The result is a combination loss for both units configured in series of 0.26 dB+the base loss BL of the device in the low-loss polarization.

By adjusting the length of the grating tap, the polarization-dependent loss of the grating PDL compensator can be controlled as per Eqn. (20). Also as per Eqn. (20) the differential loss of the compensator is controlled by controlling the magnitude of the photoinduced refractive index change $\delta n_0$.

There is no simple way to describe Eqn. (20), which applies for relatively low tap efficiencies—the condition of interest. Note however that the formalism applies to stronger gratings if the approximations used in deriving Eqn. (20) are not used.

Fabrication of Grating PDL Equalizer

Eqn. (20) is a design formula that indirectly provides the polarization dependent loss of the grating equalizer (i.e. the efficiency for tapping the x-polarization and the y-polarization, as given by the formula, is readily converted into a throughput loss for each of these polarizations. Hence light tapped out is a throughput loss; the PDL of the equalizer is the difference in the two throughput losses expressed in dB). Loss x-polarization=$10*LOG_{10}(1-tap\_efficiency\_x)$; Loss y-polarization=$10*LOG_{10}(1-tap\_efficiency\_y)$; PDL (in dB)=Loss y-polarization−Loss x-polarization.

Equation (20) can used to calculate the polarization dependent loss for different lengths of tap equalizer and for different tap equalizing grating strengths at the design wavelength of operation, given the properties of a particular optical fiber. However, the theory can be only used as a guide for the design of the grating equalizer. The actual fabrication of a grating equalizer with a predetermined PDL is carried out experimentally using an iterative process.

Figure 7:
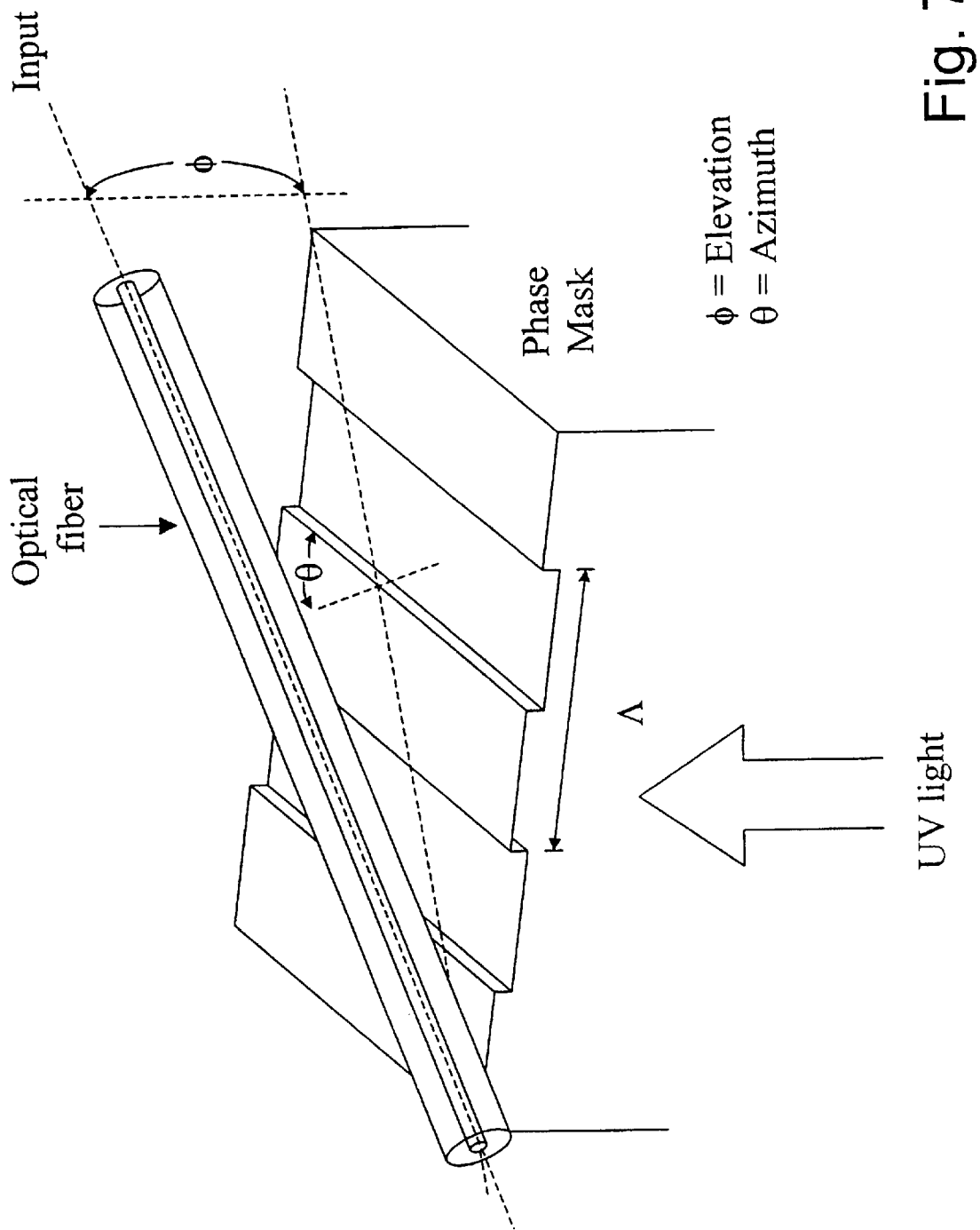
FIG. 7 is a schematic diagram showing the orientation of the phase mask with respect to the fiber in order to write blazed fiber Bragg gratings with a predetermined polarization dependent loss; it should be noted that the angle of incidence of the UV light is shown for convenience as 90% but other angles of incidence may be preferred.

FIG. 7 shows the experimental arrangement for fabricating a blazed grating PDL equalizer. A length of optical fiber is placed in close proximity to a phase mask having the appropriate phase mask grating period $\Lambda$. The fiber is positioned such that the normal to the fiber axis in the plane of the phase mask is tilted at an angle $\theta$ (azimuthal angle in FIG. 7) to the grooves of the phase mask. In practice, this tilt angle $\theta$ will be about 45 degrees so that blaze of the photoinduced index perturbations is about 45 degrees, that is if we ignore the effects of light refraction at the fiber air/cladding boundary. FIG. 7 also shows that the fiber can also be tilted in a plane containing the fiber axis and the normal to the phase mask at an angle $\phi$ (elevation angle in FIG. 7) to the surface of the phase mask. The experimental arrangement of FIG. 7 provides several means for controlling the characteristics of the photoimprinted grating equalizer. Namely, the length of the grating is determined by controlling via means of a slit aperture the length of the fiber that is irradiated by ultraviolet light. The blaze and shape of the photoinduced index perturbations is affected by angles $\phi$ and $\theta$ of tilt of the fiber with respect to the phase mask. The strength of the photoinduced index perturbation can be controlled through the intensity and total exposure of the irradiating ultraviolet light.

The fabrication of a grating equalizer with a predetermined PDL first requires determining the proper orientation of the fiber with respect to the phase mask and irradiation conditions to photoinduce a grating equalizer having a PDL somewhat less than the predetermined PDL. This would be done empirically and with the aid of equation (20). Preferably, the PDL of a photoimprinted grating equalizer is increased in small increments in an iterative fashion in order to obtain a PDL value matched to the predetermined PDL. This is done experimentally by making small changes in the parameters available for controlling the PDL of the equalizer and monitoring the resultant change in PDL. The iterative process is complete when the PDL of the equalizer is matched to the predetermined PDL of the optical component. The fiber grating equalizer is then connected to the optical component such that the total PLD of grating equalizer plus optical component is minimized. This is accomplished by butt coupling the grating equalizer to the optical component and then rotating the equalizer about its fiber axis while monitoring the total PDL. The optimum orientation for the equalizer is obtained when the total PDL is a minimum. A more permanent connection can then be made by for example fusion splicing the grating equalizer to the optical component. It should be recognized that the above process could also be carried out in-situ. That is, the grating equalizer can be photoimprinted directly in an optical fiber pigtail connected to the optical component. However for optimum results it is necessary to ensure the orientation of the blazed photoimprinted grating equalizer is such the total PDL of equalizer plus optical component can be minimized.

Of course numerous other embodiments may be envisaged, without departing from the spirit and scope of the invention. Although the invention as described has been mainly directed to providing one grating that performs an equalizing function, it is within the scope of this invention to use a plurality of in-fiber gratings which in combination provide a required attenuation, and hence equalization of a polarization state.

In addition to providing a polarization dependent loss compensator, this invention also provides a method of compensating for birefringence that can be used in series with the PDL compensator described heretofore. A birefringence compensator in accordance with an aspect of this invention consists of a section of optically photosensitive waveguide or optical fiber that has been exposed to actinic radiation, typically in the UV region of the spectrum. Uniform exposure of the section of photosensitive waveguide or optical fiber to actinic radiation photoinduces birefringence in the section that is in a proportion to the exposure dose; the direction of the photoinduced birefringence axes are controlled by the angle of incidence of the actinic radiation on the waveguide (geometrical birefringence control) and also by the polarization of the actinic radiation (optical birefringence control). The degree of polarization compensation that can be achieved with such a device is proportional to its length and to the photoinduced birefringence. Such a birefringence compensator can compensate for any unwanted birefringence present in the PDL compensated device.

To achieve compensation the birefringence in the compensator should match in magnitude any unwanted birefringence present in the PDL compensated device and the orientation of the compensator is chosen such that the fast axis of the compensator aligns with the slow axis of the PDL compensated device and vice versa. The compound device is thereby compensated for PDL and for polarization mode dispersion (PMD) within a single optical fiber. Alternatively two fibres can be spliced together to provide series compensation.

References

1. S. J. Hewlett et al, "Coupling characteristics of photo-induced Bragg gratings in depressed and matched cladding fibre", Opt. Quantum Electron. Vol. 28, pp. 1641–1654, 1996.
2. V. Mizrahi and J. E. Sipe, "Optical properties of photosensitive fiber phase gratings", J. Lightwave Technology Vol. 11, pp. 1513–1517, 1993.
3. A. W. Snyder and J. D. Love, *Optical Waveguide Theory* (Chapman Hall, New York, 1983) Chap. 21.

What is claimed is:

1. An optical system comprising:
   an optical device for passing light in a predetermined wavelength range, having substantially unequal output orthogonal polarizations for light launched into the device within said wavelength range;
   a waveguide having a longitudinal optical axis, the waveguide having a blazed grating therein having a period and a phase angle for providing a phase matching condition for a radiation mode for light launched into the device, the blazed grating exhibiting a tap efficiency difference for orthogonal polarizations for offseting and lessening a polarization dependence of the device, the waveguide being optically coupled with the optical device, and the grating being oriented about its optical axis to lessen the inequality in output orthogonal polarizations for light launched into the optical device.

2. An optical system as defined in claim 1, wherein the grating is oriented in a preferred orientation and has a suitable refractive index difference, period and length to lessen the inequality in output orthogonal polarization states by at least 50%.

3. An optical system as defined in claim 1, wherein the grating is written into the waveguide in-situ, during the monitoring of the state of polarization of the light after it has passed through the waveguide.

4. An optical system as defined in claim 1, comprising a detector optically coupled with the waveguide for detecting the polarization dependent loss for use in determining when the polarization dependent loss is minimized.

5. An optical system as defined in claim 4, wherein the grating is written into the waveguide in-situ, during the monitoring of the state of polarization of light after it has passed through the waveguide.

6. An optical system as defined in claim 1, comprising a detector optically coupled with the waveguide for detecting the polarization dependent loss for use in determining when the polarization depedent loss is minimized.

7. An optical system as defined in claim 6, wherein the grating is written into the waveguide in-situ, during the monitoring of the state of polarization of light after it has passed through the waveguide.

8. A method of lessening polarization dependence of an optical device to a band of wavelengths of light passing therethrough, comprising the steps of:
   providing in an optical waveguide having a longitudinal axis and having a blazed grating therein;
   coupling the waveguide and the optical device with the blazed grating having a period and a phase angle for providing a phase matching condition for a radiation mode of light launched into the device, the blazed grating exhibiting a tap efficiency difference for orthogonal polarizations for offsetting lessening a polarization dependence of the device; and
   orienting the blazed grating such that a polarization dependence of the device at the band of wavelengths passing therethrough is lessened.

9. A method as defined in claim 8, wherein the polarization dependence is lessened by 50%.

10. A method as defined in claim 8, further providing lessening of polarisation mode dispersion by providing the step of irradiating at least a photosensitive portion of the optical waveguide with uniform exposure to actinic radiation for photoinducing birefringence in the section; the angle of incidence being other than perpendicular to an optical axis of the optical waveguide and selected so as to induce birefringence along a predetermined axis.

11. A method as defined in claim 8, further providing lessening of polarisation mode dispersion by providing the step of irradiating at least a photosensitive portion of an optical waveguide with uniform exposure to actinic radiation for photoinducing birefringence in the section; the angle of incidence being other than perpendicular to an optical axis of the optical waveguide and selected so as to induce birefringence along a predetermined axis; and concatenating the photosensitive portion of the optical waveguide with the optical waveguide defined in claim 8.

12. An optical system comprising:
   an optical device for passing light in a predetermined wavelength range, having substantially equal output orthogonal polarizations for light launched into the device within said wavelength range;
   a waveguide having a longitudinal optical axis, the waveguide having a blazed grating therein having a period and a phase angle to provide a phase matching condition for a radiation mode for light launched into the device, the blaze angle other than an angle determined in accordance with the Brewster angle of between 20° and 45° with respect to the optical axis of the waveguide, the blazed grating exhibiting a tap efficiency difference for orthogonal polarizations for offseting and lessening a polarization dependence of the device, the waveguide being optically coupled with the optical device, and the grating being oriented about its optical axis to lessen the equality in output orthogonal polarizations for light launched into the optical device.

13. An optical system as defined in claim 12, wherein the grating is oriented in a preferred orientation and has a suitable refractive index difference, period and length to lessen the inequality in output orthogonal polarization states by at least 50%.

14. An optical system as defined in claim 12, wherein the grating is written into the waveguide in-situ, during the monitoring of the state of polarization of the light after it has passed through the waveguide.

15. A method of lessening polarization dependence of an optical device to a band of wavelengths of light passing therethrough, comprising the steps of:
   providing in an optical waveguide having a longitudinal axis and having a blazed grating therein,
   coupling the waveguide and the optical device with the blazed grating having a period and a phase angle to provide a phase matching condition for a radiation mode for light launched into the device, the blaze angle other than an angle determined in accordance with the Brewster angle of between 20° and 45° with respect to a longitudinal axis of the optical waveguide, the blazed grating exhibiting a tap efficiency difference for orthogonal polarizations for offsetting and lessening a polarization dependence of the device; and
   orienting the blazed grating such that a polarization dependence of the device at the band of wavelengths passing therethrough is lessened.

16. A method as defined in claim 15, wherein the polarization dependence is lessened by 50%.

17. A method as defined in claim 15, further providing lessening of polarisation mode dispersion by providing the step of irradiating at least a photosensitive portion of the optical waveguide with uniform exposure to actinic radiation for photoinducing birefringence in the section; the angle of incidence being other than perpendicular to an optical axis of the optical waveguide and selected so as to induce birefringence along a predetermined axis.

18. A method as defined in claim 15, further providing lessening of polarisation mode dispersion by providing the step of irradiating at least a photosensitive portion of an optical waveguide with uniform exposure to actinic radiation for photoinducing birefringence in the section; the angle of incidence being other than perpendicular to an optical axis of the optical waveguide and selected so as to induce birefringence along a predetermined axis; and concatenating the photosensitive portion of the optical waveguide with the optical waveguide defined in claim 15.

* * * * *